United States Patent [19]

Jaskowski

[11] 4,237,180
[45] Dec. 2, 1980

[54] INSULATION MATERIAL AND PROCESS FOR MAKING THE SAME

[76] Inventor: Michael C. Jaskowski, 226 Mt. Lebanon Blvd., Mt. Lebanon, Pa. 15234

[21] Appl. No.: 823,754

[22] Filed: Aug. 11, 1977

Related U.S. Application Data

[63] Continuation of Ser. No. 647,580, Jan. 8, 1976, abandoned.

[51] Int. Cl.³ .................... D04H 1/08; D04H 1/14
[52] U.S. Cl. ............................ 428/280; 19/145.5; 28/112; 156/62.6; 156/62.8; 156/85; 156/148; 428/288; 428/297; 428/299; 428/300; 428/303
[58] Field of Search .............. 428/280, 284, 285, 288, 428/297, 298, 299, 300, 301, 302, 303; 156/62.8, 62.6, 148, 85; 28/103, 107, 112; 19/145.5, 145.7

[56] References Cited

U.S. PATENT DOCUMENTS

| | | | |
|---|---|---|---|
| 2,908,064 | 10/1959 | Lauterbach et al. | 28/112 |
| 2,958,113 | 11/1960 | Lauterbach | 28/112 |
| 3,317,335 | 5/1967 | Merriman et al. | 428/91 |
| 3,338,777 | 8/1967 | Irwin et al. | 428/300 |
| 3,608,166 | 9/1971 | Gruget | 28/112 |
| 3,616,031 | 10/1971 | Fleissner | 156/285 |
| 3,752,721 | 8/1973 | Clark et al. | 156/148 |
| 3,778,334 | 12/1973 | Sturgeon | 428/285 |
| 3,917,448 | 11/1975 | Wood | 428/299 |

*Primary Examiner*—James J. Bell
*Attorney, Agent, or Firm*—Stanley J. Price, Jr.

[57] ABSTRACT

A plurality of nonflammable, heat sensitive organic fibers are intimately admixed by blending with inorganic fibrous materials such as glass wool, mineral wool and asbestos fibers. The admixture of the organic and inorganic fibers is processed by carding or garnetting to form an insulating composite body of a preselected thickness. The nonflammable, heat sensitive fibers, such as polyester fibers, may be oriented within the composite body by a needling process to interlock the inorganic fibers and compress the composite body to cohesively bind the fibers in a batting. This prevents the composite body from splitting and also serves to decrease the thickness and increase the density of the composite body. The interlocked arrangement of heat sensitive organic fibers and inorganic fibrous material is subjected to a shrinking treatment at a temperature in the range between about 212° to 300° F. for a preselected time interval. The heat sensitive, organic fibers contract at the elevated temperature and bind the inorganic fibers together to form a composite insulating material having a tensile strength sufficient to prevent splitting of the fibrous materials and economically fabricated without material waste or generation of pollutants.

9 Claims, 4 Drawing Figures

INSULATION MATERIAL AND PROCESS FOR MAKING THE SAME

CROSS REFERENCE TO RELATED APPLICATION

This application is a continuation of co-pending application Ser. No. 647,580 filed on Jan. 8, 1976 now abandoned entitled "Insulation Material And Process For Making The Same".

BACKGROUND OF THE INVENTION

1. Field of the Invention

This invention relates to an insulation material and more particularly to thermal and sound insulation material that includes a mineral wool batting interlaced with a plurality of nonflammable, heat sensitive organic fibers that bind together the fibers of the mineral wool batting to provide an insulation material having a preselected thickness and density with uniform tensile strength throughout.

2. Description of the Prior Art

Thermal and sound insulation, as illustrated and described in U.S. Pat. Nos. 2,579,035; 2,598,102; 2,612,162; 2,633,433; and 3,144,376 include a glass fiber batting in which felt-like layers are bound together by a resinous binder either of the thermosetting or the thermoplastic type, depending upon the particular characteristics desired for the insulation material.

The inorganic fibers are arranged in an interwoven relationship to form a fibrous layer of material having a preselected thickness and density. Formation of the felted structure from the mineral wool fibers is followed by the application of a thermosetting resin to the fibrous layers. The resins are generally applied in the form of an aqueous solution of a water-soluble liquid thermosetting resin in liquid form, an aqueous dispersion of a water insoluble thermosetting resin or in a dry, powdered, finely divided form.

The most commonly utilized thermosetting resins and binders for felted insulation material are phenol-formaldehyde, resorcinol-formaldehyde, urea-formaldehyde and furfural-formaldehyde. The composite body made up of the layer of felted inorganic fibers has an unset binder distributed throughout the fibers and is transferred to an oven where the fibers in the binder are subjected to a setting temperature, preferably in the range of about 400° to 500° F. for a preselected time interval. When the composite body leaves the oven, the binder is allowed to cool and harden at room temperature.

The use of thermosetting resins as binders for the inorganic fibers of the felted body present a substantial health hazard during the application of the binder. During the application stage, and particularly in the case of binders in dry, powdered form and liquid spray form, up to 10% of the material is lost and dispersed into the air constituting a deleterious working environment. Furthermore, material that is not dispersed into the air and is carried away in liquid form is frequently discharged as a water pollutant. In the case of an aqueous emulsion of the water insoluble thermosetting resin in liquid form, the emulsion breaks down when discharged as waste, and the resinous binder by-product presents a serious health hazard if permitted to contaminate a public water system. Additional losses take place as a consequence of vaporization during the curing operation. As much as a 5 to 10% loss will occur at this stage in addition to whatever losses occur during the application stage of the resinous binder to the felted body. Therefore, to accommodate the resultant losses, excess of resinous binder must be applied to assure that the minimum adhesion is obtained for the felted body.

In addition to forming insulating articles by the application of a bonding resin to nonwoven, inorganic fibers it has also been suggested, as disclosed in United States Pat. No. 3,660,222, to impregnate threads of synthetic polyester fibers with a binding resin. The fibrous webs are formed by the conventional process of carding or garnetting. The fibrous web is sprayed by a resinous bonding agent and cured to form a laminated body of polyester fibers. However, waste of materials and generation of pollutants occur in spraying the resinous liquid onto the surface of the fibrous web.

There is need for a thermal and sound insulating material fabricated by interlocking inorganic fibers to form a felted body or batting in which the fibers are adhesively bonded together to form a composite fibrous insulating material of a preselected thickness and density with substantially uniform tensile strength throughout. While it has been suggested by the prior art to bind the fibrous layers together by the application of a resinous binder in liquid or powder form, a substantial portion of the binder is lost upon application and curing. In addition, the curing must take place at temperatures in excess of 400° F. presenting a considerable health hazard in the form of air and water pollution.

SUMMARY OF THE INVENTION

In accordance with the present invention, there is provided an insulation material that includes a layer of an intimate admixture of inorganic fibrous material and heat sensitive, organic synthetic fibrous material having a preselected size being intimately dispersed within the layer of material. The heat sensitive, organic fibers are randomly arranged throughout the admixture such that when heated to an elevated temperature are operable to mechanically interlock the fibers of the layer of inorganic fibrous material to form a bonded insulating composite body. The bonded insulating composite body has a plurality of interstices dispersed throughout formed by the interlocking arrangement of the inorganic fibrous material with the heat sensitive, organic synthetic fibers.

The inorganic fibrous material is selected from the group consisting of glass wool, mineral wool and asbestos fibers. The inorganic fibers are intimately admixed in a conventional blending apparatus with a plurality of the heat sensitive, organic synthetic fibers. The admixture of inorganic and organic synthetic fibers is conveyed through a carding or garnetting machine to mechanically interlock the fibers to form the insulating composite body of a preselected thickness and density. A plurality of the composite bodies thus formed may be overlapped to form a laminate structure or batting of inorganic fibers interlaced with the heat sensitive, organic synthetic fibers.

The heat sensitive, organic synthetic fibers include nonflammable fibers selected from the group consisting of vinylidene chloride fibers, polyethylene fibers, polystyrene fibers, copolymer polystyrene fibers, acrilonitrile fibers, polyamide fibers, polyvinylchloride fibers, and acetate fibers. The fibers have a length in the range between about ⅛ to 1½ inches and may be interlocked with the inorganic fibers by a needling process in which the synthetic organic fibers are interlaced within the batting of inorganic fibers. The composite body of inorganic and heat sensitive, organic fibers is compressed by the needling process, removing air and increasing the strength and resistance of the composite body to separation or delamination. The bond effected adhesion between the synthetic organic fibers and the layers of the inorganic fibers promote fabric integrity substantially uniform throughout the entire composite insulating material.

After the carding or garnetting process and, if desired, the needle punching, the batting of inorganic fibrous material interlaced with synthetic, organic fibers is subjected to a shrinking treatment. The batt is exposed to elevated temperature by radiant heat, superheated steam or reflected thermal heat and the like to a temperature in the range between about 212° and 300° F. for a time period between about 1 to 3 minutes. The fibrous batt is further compressed by the controlled shrinking of the individual heat sensitive organic synthetic fibers and subjecting them to preselected pressure forces. In this manner, the thickness of the insulation material, and, therefore, the density thereof, is controlled to provide desired sound or thermal insulation requirements.

Accordingly, the principal object of the present invention is to provide an insulating material fabricated from a compressed layer of inorganic fibrous materials that are bonded together by the interlocking of a plurality of heat sensitive, synthetic organic fibers with the inorganic fibrous material.

A further object of the present invention is to provide an insulating material formed from a plurality of inorganic fibrous layers arranged in a felted relationship where the individual layers are adhesively bonded together by an interlocking arrangement of synthetic organic fibers.

A further object of the present invention is to provide a felt-like insulation material of a preselected thickness and density with the material including a plurality of inorganic fibrous layers bonded together by an organic fibrous binder material in a process that substantially eliminates the generation of pollutants and material waste.

A further object of the present invention is to provide an inorganic fibrous insulation material that includes a plurality of individual felted layers bonded together by organic synthetic fibers that eliminates the need of a resinous binder thereby preventing material loss and the generation of pollutants inherent with insulation materials formed by a resin binder.

These and other objects of this invention will be more completely described and disclosed in the following specification, the accompanying drawings and the appended claims.

DESCRIPTION OF THE PREFERRED EMBODIMENTS

Figure 1:
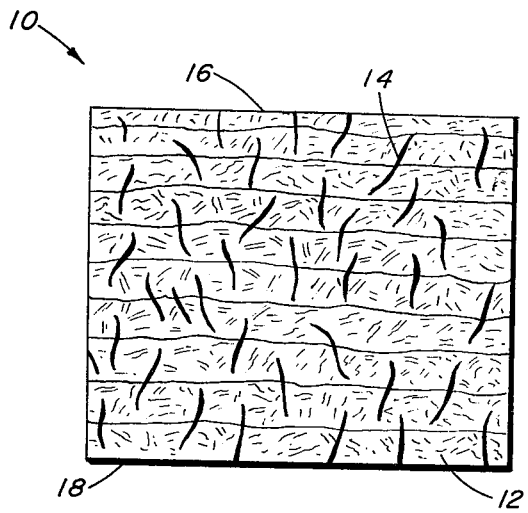
FIG. 1 is a sectional view in side elevation of the composite insulating material, illustrating the admixture of the heat sensitive organic synthetic fibers with the inorganic fibrous material.
Figure 2:
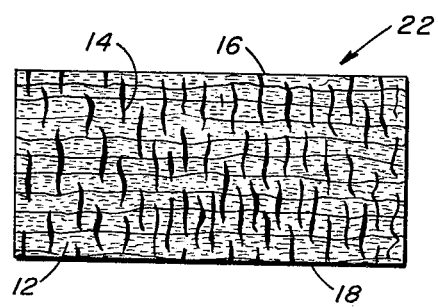
FIG. 2 is a sectional view similar to FIG. 1, illustrating the heat sensitive organic synthetic fibers mechanically interwoven within the inorganic fibrous material.
Figure 3:
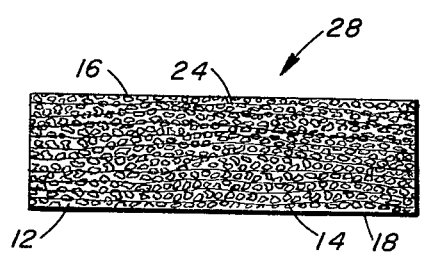
FIG. 3 is a sectional view of the composite insulating material, illustrating the interstices formed in the composite insulating material by the application of heat resulting in the shrinkage of the heat sensitive organic synthetic fibers and the further binding of the inorganic fibers.

Referring to the drawings, and particularly to FIGS. 1-3, there is illustrated a composite insulating material generally designated by the numeral 10 that includes a nonwoven layer or batting 12 of fibrous material of a preselected thickness. The fibrous layer 12 may include a plurality of individual felt-like batts of fibrous inorganic material in which each batt is prepared in a conventional manner, as by carding, garnetting, cross-lapping, or by air deposition and other like methods to be later explained, in greater detail. The composite layer 12 includes inorganic fibrous material that is preferably fabricated from glass wool, mineral wool, glass fibers, asbestos fibers and the like. A plurality of the individual felt-like batts may be interlaced to form the resultant layer 12, having a preselected thickness, length and width. The fibrous layer 12 includes a plurality of individual heat sensitive, organic synthetic fibers 14 that are intimately admixed with the inorganic fibers by blending to form the fibrous layer 12.

The heat sensitive organic fibers 14 are nonflammable fibers that are selected from the group consisting of: vinylidene chloride fibers, polyethylene fibers, polystyrene fibers, copolymer polystyrene fibers, acrilonitrile fibers, polyamide fibers, polyvinylchloride fibers, and acetate fibers. The fibers 14 preferably range in length from $\frac{1}{8}$ to $1\frac{1}{2}$ inches and have a preselected fiber denier to provide the selected bulk density of the heat sensitive inorganic fibers, in accordance with the insulation applications of the composite insulating material 10. The concentration by volume of the heat sensitive organic fibers 14 in mixture with the inorganic fibers of the layer 12 is also dependent upon the insulation requirements of the composite material 10 and is generally in the range between about 2 to 10% by volume and is preferably in the range of about 3 to 5% of organic fibers 14 in mixture with the fibers of the inorganic layer 12.

Prior to the formation of the fibrous composite body 10, the heat sensitive, organic fibers are intimately admixed, as by blending, with the inorganic fibers to provide a mixture of organic fibers evenly distributed throughout the inorganic fibers. The admixture is then formed in a three dimensional felt-like layer by carding or garnetting the fibers in which the organic fibers 14 are randomly interlaced within the fibrous inorganic material. As stated hereabove, the composite insulating material 10 of organic and inorganic fibers may vary in density and thickness as determined by the number of individual batts that are felted together by a conventional cross-lapping operation.

To increase the tensile strength of the composite insulating material, the organic fibers 14 may be selectively oriented within the fibrous layer 12, as illustrated in FIG. 2, by passing the composite insulating material 10 through a needle loom or a needle felter. A needle felting machine, as known in the art, is a reciprocating drive machine that includes a needle board filled with barbed needles. The insulating material 10 is horizontally fed between the vertically oscillating needle boards, in which the barbed needles penetrate the horizontal surfaces 16 and 18 of the composite material 10 to perpendicularly align a substantial number of the organic fibers 14 with the inorganic fibers and thereby mechanically interlock the inorganic fibers by the heat sensitive organic fibers 14. In this manner, the composite insulating material 10, particularly in the formation of sound insulation, is given a structural strength sufficient to resist splitting or delamination. Thus, the weaker adhesive forces between the individual layers of the inorganic fibrous material comprising the composite layer 12 is supplemented by the bond achieved between the inorganic layers by the organic fibers 14. By the needling process, a composite insulating material may be formed having a desired weight, thickness and density. By interlocking the inorganic fibers, the composite material 10 is compressed, thereby reducing the thickness of the material and increasing the density thereof. In this manner, the desired insulating properties of the composite material 10 are attained.

The fabric strength of the composite insulating material 22 is enhanced by a stabilizing treatment in which the composite material is further compressed and strengthened by subjecting it to heat. Preferably, the composite insulating material 22 is subjected to heat in the range between about 212°–300° F. for a period of time between 1 to 3 minutes. As a consequence, the heat sensitive organic fibers 14 contract or shrink and draw together the inorganic fibrous material, as illustrated in FIG. 3, to provide a dense insulating composite material, having a plurality of interstices 24 formed between and among the layers of organic fibers. The percentage of shrinkage is controlled by the temperature and rates of heating. In this manner, shrinkage of 40% to 90% of the length of the organic fibers 14 takes place.

With the heat sensitive, organic fibers 14 blended within the inorganic fibers or perpendicularly aligned within and interlocked with the inorganic fibers by the needling process, the shrinking of the organic fibers 14 exerts a compressive force upon the inorganic fibers. This draws the felted layers together to form a stabilized composite insulating material 28 having air spaces or interstices 24 formed therein. Thus, the inorganic fibers are permanently bonded together to provide a rigid insulating material capable of resisting splitting and delamination. In addition, by controlling the shrinking process, the thickness and density of the composite insulating material 28 may be controlled to provide the desired insulation properties.

Figure 4:
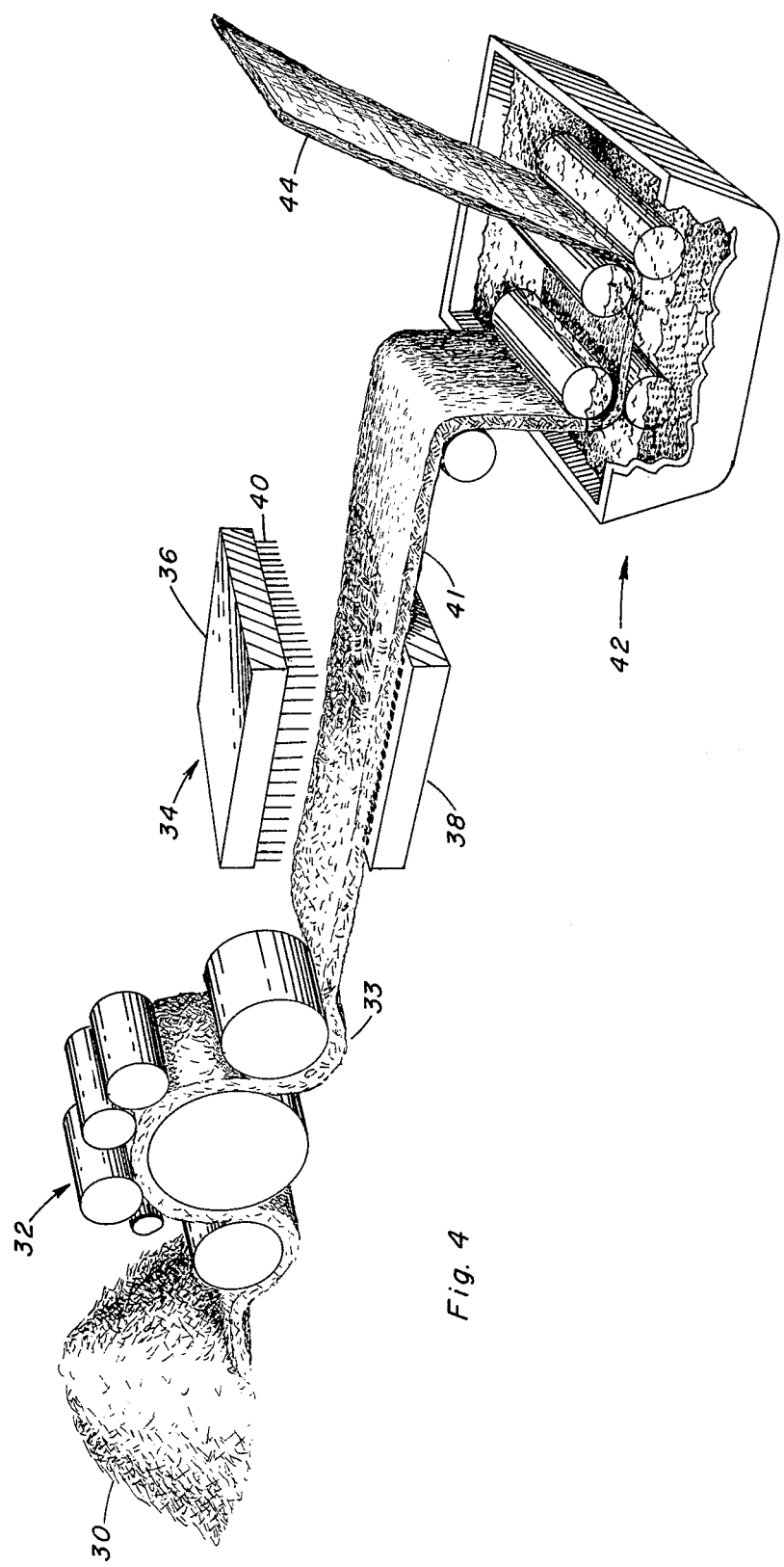
FIG. 4 is a schematic representation of the process for forming the composite synthetic material by bonding together the inorganic fibrous material with the heat sensitive, organic synthetic fibers.

The process by which the inorganic fibrous layers of the composite insulating material are bound together by the heat sensitive, organic fibers is schematically illustrated in FIG. 4. Initially, the heat sensitive, organic fibers are admixed in a selected concentration with the inorganic fibers by a conventional blending operation. The admixture 30 is conveyed upon an apron to a conventional garnetting or carding machine 32. The carding machine 32 interlaces the fibers to form a continuous nonwoven batting or pad 33 of a preselected thickness and width. A plurality of batts may be joined together in overlapping relation by cross lapping a selected number of batts. In this manner, the density and thickness of the insulation material may be increased.

The fiber entanglement of organic and inorganic fibers, illustrated in FIG. 1, is fed upon a suitable conveying means to the needle felter or needle loom 34. As described hereinabove, the needle loom includes a pair of needle boards 36 and 38 equipped with a preselected array of barbed needles 40. One or both of the needle boards 36 and 38 are oscillated at a controlled rate in timed relation with the horizontal feed of the organic and inorganic fiber batting to move the barbed needles in and out of the batting. In this manner, the heat sensitive, organic fibers are interlaced with the inorganic fibers to provide a three dimensional fiber entanglement 41 having a uniform thickness throughout. The inorganic fibers are locked together by the organic fibers to provide a bond between the inorganic fibers or overlying layers of inorganic fibers sufficient to permit handling and prevent splitting of the fibrous layers. The insulation material formed by the needling process is particularly useful as a sound insulation material.

Simultaneously with the needling operation or in substitute thereof, the composite insulating material batt 41 may be compressed by rollers to remove air and increase its strength, as further required by the desired insulation application. The mechanical strength and dimensional stability of the needle punched batt 22, illustrated in FIG. 2, is determined by the interlocking arrangement of the inorganic fibers by the heat sensitive organic fibers. The size of the needles, number and types of barbs, fiber diameter, the surface characteristics, the number of needles, the number of punches per unit area and the penetration of the needles are all controlled during the needling process to contribute to the mechanical and structural stability of the needle punched batts 22. It should be pointed out that the needling process is a preferred step in the formation of sound insulation, in accordance with the present invention, but it is not essential in the formation of thermal insulation.

Following the needling process in the fabrication of sound insulation and following the carding process in the preparation of thermal insulation, the composite insulating material 41 of the heat sensitive, organic fibers interlaced within the inorganic fibrous materials is subjected to a shrinking treatment, as illustrated in FIG. 4. The composite insulating material 41 is introduced into a suitable heating device 42, which heats the material to a preselected temperature in the range between about 212° to 300° F. The shrinking treatment may be carried out by conventional methods, such as radiant heat, electrical heat, reflected thermal heat, superheated steam, and the like. The shrinking treatment continues for a period of time between about 1 to 3 minutes in which the heat sensitive organic fibers contract or shrink to a portion of their original length. Contraction of the heat sensitive, organic fibers within the organic fibers draws together or compresses the composite material 41 to form a resultant composite insulating material 44 having a desired weight, thickness and density, and a plurality of interstices dispersed throughout and formed by the interlocking arrangement of inorganic and organic fibers.

The admixing of the heat sensitive organic fibers with the inorganic fibers may be accomplished by air-flocculation of the heat sensitive, organic fibers onto the inorganic fibrous batts. With this arrangement, each batt of inorganic fibrous material formed by the carding process is sprayed with minute organic fibers. Preferably, in the air-flocculation process, the fibers are less than ½ inch in length. A plurality of fibrous batts formed in this manner may then be arranged in interlocking overlying relation by a cross-lapping machine to provide a composite insulating material having a preselected thickness and density. The multilayer batting is then subjected to the needling process, if desired, and finally heated during the shrinking stage to provide the desired insulation properties.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. An insulating material comprising,
   a layer of an intimate admixture of inorganic fibrous material and heat sensitive, organic synthetic fibrous material,
   said organic fibrous material including fibers having a length of less than ⅛ inch,
   said heat sensitive organic fibrous material being sprayed by air-flocculation into mixture with said inorganic fibrous material so that said organic fibrous material is intimately dispersed within said entire layer of said intimate admixture,
   said organic fibrous material being arranged in said entire layer of material in a concentration by volume with said inorganic fibrous material in the range between about 2 to 10%,
   said heat sensitive, organic synthetic fibrous material being randomly arranged throughout said admixture such that when heated to an elevated temperature in the range between about 212° to 300° F. shrinks to at least 40% in length and thereby mechanically interlocks said inorganic fibrous material to form a bonded insulating composite body, and
   a plurality of interstices being dispersed throughout said bonded insulating composite body by the interlocking arrangement of said inorganic fibrous material with said heat sensitive, organic synthetic fibrous material.

2. An insulating material as set forth in claim 1 which includes,
   said admixture including said inorganic fibrous material entangled in a felted relationship, and
   said heat sensitive, organic synthetic fibrous material being dispersed in an interlocking relationship with said felted inorganic fibrous material to form said insulating composite body having a preselected thickness and density.

3. An insulating material as set forth in claim 1 in which said layer of an intimate admixture includes,
   a nonwoven batting of inorganic fibers and heat sensitive synthetic organic fibers, said organic fibers being randomly dispersed throughout said nonwoven batting.

4. An insulating material as set forth in claim 1 which includes,
   said inorganic fibrous material is selected from the group consisting of glass wool, mineral wool, and asbestos fiber.

5. An insulating material as set forth in claim 1 wherein,
   said heat sensitive, organic synthetic fibrous material includes nonflammable polyester fibers.

6. An insulating material as set forth in claim 1 wherein,
   said heat sensitive, organic synthetic fibrous material includes nonflammable fibers selected from the group consisting of vinylidene chloride fibers, polyethylene fibers, polystyrene fibers, copolymer polystyrene fibers, acrilonitrile fibers, polyamide fibers, polyvinylchloride fibers, and acetate fibers.

7. A process for making an insulating material comprising,
   spraying by air-flocculation a nonflammable heat sensitive, organic fibrous material having fibers with a length of less than ⅛ inch into mixture with inorganic fibrous material to form an intimate admixture,
   randomly orienting said organic fibrous material throughout said inorganic fibrous material in a concentration by volume with said inorganic fibrous material in the range between about 2 to 10%, and
   heating said intimate admixture to an elevated temperature in the range between about 212° to 300° F. for a period of time between about one to three minutes such that said inflammable heat sensitive, organic fibrous material contracts to bond together said inorganic fibrous material and form an insulating composite body having a preselected thickness and density.

8. A process for making an insulating material as set forth in claim 7 which includes,
   carding said admixture of inorganic and nonflammable heat sensitive, organic fibrous material to form a nonwoven batting having a preselected thickness and density, and
   needling said nonwoven batting to mechanically interlock said inorganic fibrous material and said nonflammable heat sensitive, organic fibrous material and thereby form an adhesive bond.

9. A process for making an insulating material as set forth in claim 7 which includes,
   contracting said organic fibrous material within said admixture to shrink the fibers of said organic fibrous material to at least 40% in length and thereby reduce the thickness of the composite body.

* * * * *

UNITED STATES PATENT AND TRADEMARK OFFICE
CERTIFICATE OF CORRECTION

PATENT NO. : 4,237,180
DATED : December 2, 1980
INVENTOR(S) : Michael C. Jaskowski It is certified that error appears in the above-identified patent and that said Letters Patent are hereby corrected as shown below:

Column 4, line 44    after "5%" insert --by volume--.

Column 6, line 7     at the end of the line delete "inro" and insert --inor--.

Signed and Sealed this

Seventeenth Day of April 1984

[SEAL]

*Attest:*

GERALD J. MOSSINGHOFF

*Attesting Officer*    *Commissioner of Patents and Trademarks*